United States Patent [19]

Su et al.

[11] Patent Number: 5,751,860

[45] Date of Patent: May 12, 1998

[54] METHOD FOR COMPRESSING AND DECOMPRESSING DIGITAL IMAGE DATA

[75] Inventors: Yang-Chun Su, Taoyuang; Yu-Wen Huang, Taoyuan, both of Taiwan

[73] Assignee: Acer Peripherals, Inc., Taiwan

[21] Appl. No.: 708,276

[22] Filed: Sep. 3, 1996

[51] Int. Cl.⁶ .................................................. H04N 1/41
[52] U.S. Cl. ........................ 382/244; 382/238; 382/246; 358/261.2; 358/426
[58] Field of Search ........................... 358/262.1, 426, 358/455, 458, 430, 261.3, 261.2, 261.1, 427, 261.4; 382/245, 244, 238, 246; 341/67, 65, 79, 51; 395/114

[56] References Cited

U.S. PATENT DOCUMENTS

| | | | |
|---|---|---|---|
| 4,739,308 | 4/1988 | Lienard | 341/67 |
| 4,916,544 | 4/1990 | Lienard et al. | 358/262.1 |
| 4,922,340 | 5/1990 | Iwai | 358/455 |
| 5,339,077 | 8/1994 | Venbrux et al. | 341/67 |
| 5,448,642 | 9/1995 | Yeh | 382/232 |

*Primary Examiner*—Edward L. Coles, Sr.
*Assistant Examiner*—Fan Lee

[57] ABSTRACT

A compressing method consisting of generating a predicted value for the pixel of the digitized image to be compressed based on the values of at least two neighboring pixels is provided. After calculating the difference between the predicted value and the current pixel value, a prediction error is defined by a one-on-one mapping on the difference obtained. According to an advantageous feature of the mapping relationship, the required number of bits for representing the prediction error is less than that required for the difference per se. Afterwards, a parameter K is generated which is in proportion to the difference between the neighboring pixels used in prediction. According to the respective values of the parameter K, the next step is to encode each prediction error by assigning a variable-length Rice code to the prediction error of each pixel. If the Rice code formatted for a prediction error is longer than a predetermined length, the Rice code is disregarded and replaced by predetermined length of leading "1" bits followed by the value of current pixel.

8 Claims, 5 Drawing Sheets

METHOD FOR COMPRESSING AND DECOMPRESSING DIGITAL IMAGE DATA

BACKGROUND OF THE INVENTION

1. Field of the Invention

The present invention relates to a method for compressing/decompressing of digitized images without loss of data.

2. Description of the Related Prior Art

The conventional variable-length Huffman encoding scheme for compressing pixel of digitized image suffers a limitation of a complete probability table for all encoding classes being required before generating Huffman codes. This limitation constitutes a bottleneck for the Huffman encoding to perform real-time high speed data compressing and de-compressing under which the Huffman table must be updated regularly. U.S. Pat. No. 4,916,544 (hereinafter 544 patent) discloses a conditional encoding of pixels of digitized image by assigning a variable-length code to each pixel, taking into account of its value and the values of two neighboring pixels. In 544 patent, various codes are combined into a smaller number of encoding classes that all exhibit substantially the same probability of appearance. Especially when the image acquisition speed is high, the prior art data compressing/decompressing techniques that must create and update the Huffman table are not fast enough.

The object of the present invention is a method for data losslessly compressing and decompressing of digitized image data by a Rice encoding scheme.

SUMMARY OF THE INVENTION

The compressing method of the present invention consists of generating a predicted value for the pixel of the digitized image to be compressed based on the values of at least two neighboring pixels. After calculating the difference between the predicted value and the current pixel value, a prediction error is defined by a one-on-one mapping on the difference obtained. According to an advantageous feature of the mapping relationship, the required number of bits for representing the prediction error is less than that required for the difference per se. Afterwards, a parameter K is generated which is in proportion to the difference between the neighboring pixels used in prediction. According to the respective values of the parameter K, the next step is to encode each prediction error by assigning a variable-length Rice code to the prediction error of each pixel. If the Rice code formatted for a prediction error is longer than a predetermined length, the Rice code is disregarded and replaced by predetermined length of leading "1" bits followed by the value of current pixel. On the other hand, when the compressed code for a pixel is under decompressing, the above procedures are reversed.

Without using the Huffman coding in the present invention, traditional requirement of creating probability table is dispensed with. The necessary memory size for performing the image compressing or decompressing is tremendous reduced, and it makes the system simpler.

Another advantage of the invention comes from the un-necessity of probability statistic table. The memory read/write activities are performed simultaneously during decompressing. The invention provides high speed decompressing of large amount of digitized image data.

DETAILED DESCRIPTION OF PREFERRED EMBODIMENT OF THE INVENTION

Figure 1:
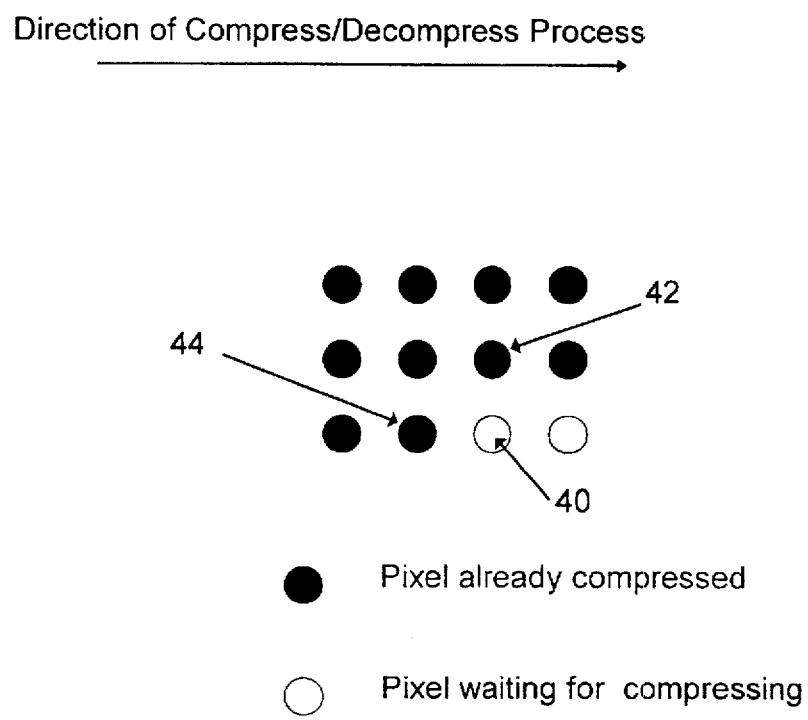
FIG. 1 shows the position relationship between the current pixel and neighboring pixels.

As shown in FIG. 1, A is value of the preceding pixel 44 in the row same as current pixel 40, and B is the value of preceding pixel 42 in the column same as current pixel 40. In the following description an 8 bit binary code is used to represent each pixel, and the value of each pixel varies in the range of [0, 255].

1. Compressing

Figure 2:
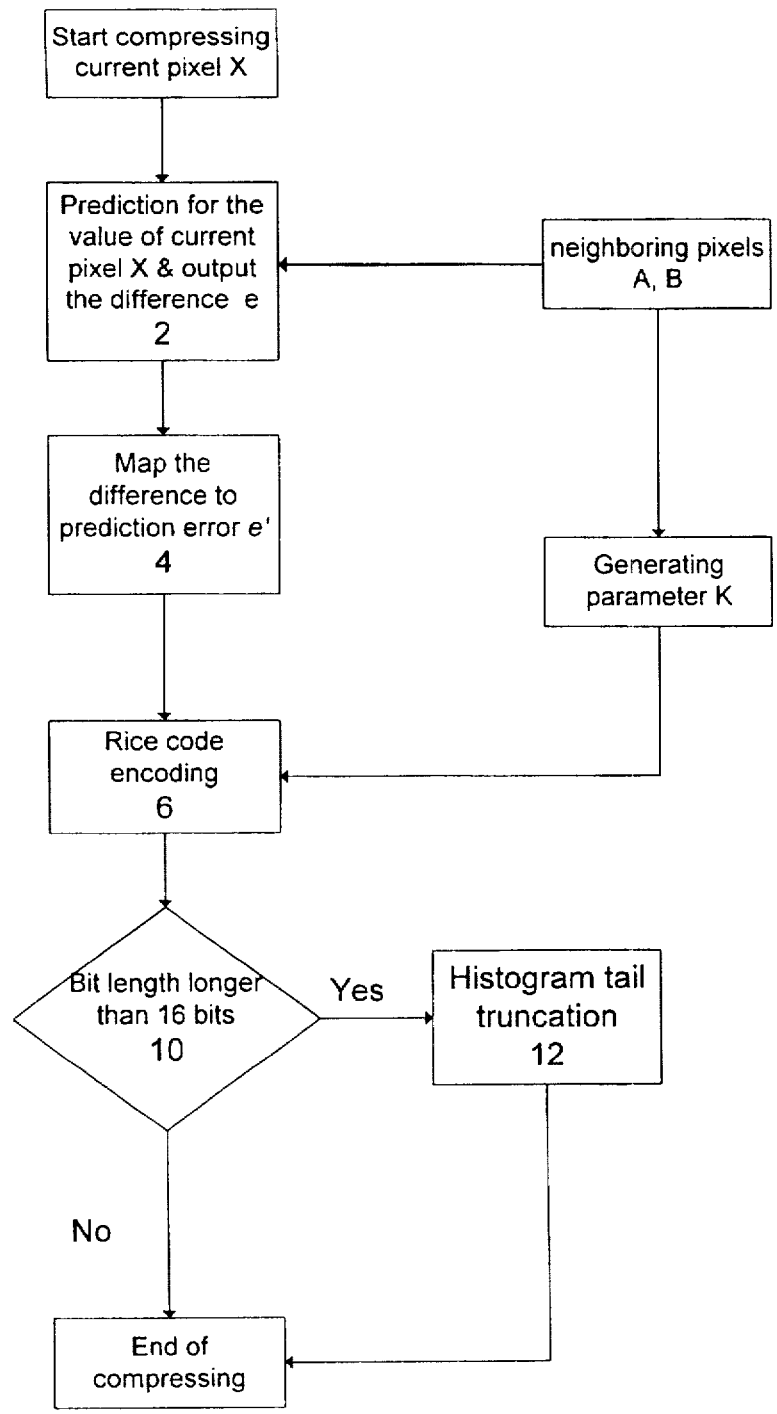
FIG. 2 shows the procedures of the compressing method according to the present invention.

FIG. 2 shows the flow chart of the compressing method in accordance with the present invention which includes four major procedures: Prediction 2, Mapping of Difference 4, Rice encoding 6, and Histogram Tail Truncation 12. The detailed explanations for each major procedure are described as follows.

(a) Prediction

Due to the characteristic of natural images, it is expected that the correlation between neighboring pixels in image should be very high, except for the edge areas. The value X of the current pixel under compressing can be predicted based on its neighboring pixels.

To make the hardware implementation simple, the formula $p=(A+B)/2$ is used to generate the predicted value p for current pixel. Through the calculation of $e=x-p$, the difference between the predicted value and the current pixel value X is obtained, and it is outputted at block 2 of FIG. 2.

For instance, in case the value of pixel A, B, X, is 130, 146, and 144 respectively, the predicted value p is $(130+146)/2=138$, and the difference $e(e=x-p)$ between the predicted value and the current pixel value is 6.

(b) Mapping of Difference e:

The possible value of the difference e varies in the range $[-p, 255-p]$. When the extreme conditions of (p=0, x=255) or (p=255, x=0) occurs, the possible value for the difference e is in the range $[-255, 255]$ which needs 9 bits to encode.

The purpose of the following mapping process is to perform one-on-one mapping of the difference e and, as a result, only 8 bits are required to encode the resulted error e'. It is to be noted, without this mapping, the compressing or decompressing method of the invention still works correctly. Therefore, this mapping process should be an optional to the compressing/decompressing method of the invention.

```
if (e ≠ 0)
{
    if (p ≦ 128)
        if (|e| ≦ p)
            if (e < 0)      e' = -2*e
            else            e' = 2*e - 1
        else e' = p + |e|
    else
        if (|e| ≦ (255 - p))
            if (e < 0)      e' = -2*e
            else            e' = 2*e - 1
        else e' = 255 - p + |e|
}
```

When $p \leq 128$, the above procedure maps the values $[-p, -p+1, -p+2, \ldots -1, 0, 1, \ldots, p, p+1, p+2, \ldots, 255-p]$ of the difference e to the values [0, +1, −1, +2, −2, . . . +p, −p, p+1, p+2, . . . 255−p] of the prediction errors e' respectively.

Similarly, when p>128, the values [−p, −p+1, −p+2, . . . −1, 0, 1, . . . , p, p+1, p+2, . . . , 255−p] of the difference e is mapped to [0, +1, −1, +2, −2, . . . 255−p, −(255−p), −(255−p)−1, . . . , −p] of the prediction errors e' respectively. It is to be noted, by above procedure, the requirement of a small e corresponding to a small e' is sustained.

For example of the predicted value p and the difference e being 138 and 6 respectively, the e is mapped to the prediction error e'=2*e−1=11, which will be outputted at block 4 in FIG. 2.

(c) Rice code encoding (Table 1)

Because the probability for small-error occurrence is much higher than that for the large-error, a statistic coding scheme should be applied to save the code size for e'.

As mentioned above, due to the hardware complexity, it is not wise to implement the conventional Huffman coding for the e'. The Rice code is chosen in the preferred embodiment to encode e' because of its implementation simplicity.

The following steps of Rice encoding scheme are performed to encode an integer n with parameter k: (1) the value of $\lfloor n/2^k \rfloor$ is calculated and outputted as an Unary code, wherein $\lfloor \ \rfloor$ is an integer operator, i.e., $\lfloor n/2^k \rfloor$ bit of "1", plus one bit "0" as the partition code between the Unary code and Binary code recited hereinafter; (2) the (n mod $2^k$) is calculated and outputted as a k-bit Binary code; (3) combine these two codes together to form the Rice code.

For example, when n=4, k=2, $\lfloor n/2^k \rfloor = \lfloor (4/4) \rfloor = 1$, its Unary code being "1"; (n mod $2^k$)=(4 mod 4)=0, its 2 bit binary code being "00". They are combined to form the Rice code of "1000", wherein the third "0" is the partition code. Table 1 lists the Rice codes of integer n=0~8 for parameter k=0~3 respectively.

k=4, if 8<Δ

For the example of A being 130 and B being 146, the value of parameter k is 4 because of Δ=16. Using Rice code to encode e'=11 with parameter k=4, $\lfloor (n/2^k) \rfloor = \lfloor (11/16) \rfloor = 0$, the number of Unary code being "0"; (n mod $2^k$)=(11 mod 16)=11, its 4-bit binary code being 1011. The Rice code for e' of current pixel X is 01011.

(d) Histogram Tail Truncation

It is expected that the long Rice code rarely happens. However, once it happens, it increases the complexity of hardware implementation and reduces the compression rate. The functional blocks 10 and 12 are provided to solve this problem. If the obtained Rice code is longer than 16 bits in block 10, the encoding procedure for this current pixel is terminated and the code of current pixel will be replaced by a 24-bit code in the block 12 of Histogram Tail truncation operation. The 24-bit code includes 16 leading "1" bits followed by an 8-bit binary code which is the value of current pixel. The set of 16 leading "1" bits work as a prefix indicating the following 8-bit binary code representing the original value of current pixel.

For instance, in event the values A, B of neighboring pixels are 140 respectively, and current pixel is at the edge portion and its value X is 10 (binary code=00001010). Then the p is 140, Δ is 0, k is 1, e is 130 and e'=245. Using Rice encoding scheme to encode e'=245 with parameter k=1, the Rice code for e' should be 122 bit of "1" plus "0", partition code, plus "1", Binary code. Because that Rice code is longer than 16 bits, it will be replaced by 111111111111111100001010 in accordance with Histogram Tail truncation operation.

(e) Circuit

Due to this truncation process in block 12, the longest code used in the present invention is limited to 24 bits, and

TABLE 1

| Rice | n=0 | n=1 | n=2 | n=3 | n=4 | n=5 | n=6 | n=7 | n=8 |
|---|---|---|---|---|---|---|---|---|---|
| k=0 | 0 | 10 | 110 | 1110 | 11110 | 111110 | 1111110 | 11111110 | 111111110 |
| k=1 | 00 | 01 | 100 | 101 | 1100 | 1101 | 11100 | 11101 | 111100 |
| k=2 | 000 | 001 | 010 | 011 | 1000 | 1001 | 1010 | 1011 | 11000 |
| k=3 | 0000 | 0001 | 0010 | 0011 | 0100 | 0101 | 0110 | 0111 | 10000 |

Obviously from the Table 1, it is more beneficial to encode a small integer n using a small parameter k. On the contrary, it is more beneficial to encode a large integer n using a large parameter k. Therefore, choosing a suitable parameter k becomes a critical issue when using Rice code to encode e'. Since it is difficult, for all possible combinations of A and B, to define a clear boundary deciding e' is small or large, there might exist a plurality of criteria for making the choice. To avoid the hardware complexity, a simple algorithm to define the value of parameter k is necessary.

Since successive pixels exhibit a high correlation in the natural images except at the edge portion, a large e' might only occur over the image edge's pixels. The values of already compressed neighboring pixels A, B should be a good indication of the existence of image edges. The preferred embodiment of simple algorithm to define the value of parameter k is k=α(Δ), α is an operator defined according to the following criterion, and Δ=|A−B|.

k=1, if Δ<=2
k=2, if 2<Δ<=4
k=3, if 4<Δ<=8 the hardware implementation is dramatically simplified. All the processes mentioned in the compressing method of the invention can be implemented using some simple buffers, i.e. arithmetic and logic operators, i.e. +, −, *, / , and comparator operations. For those skilled in the art, numerous hardware circuits are readily designed for performing above compressing method.

2. Decompressing

Figure 3:
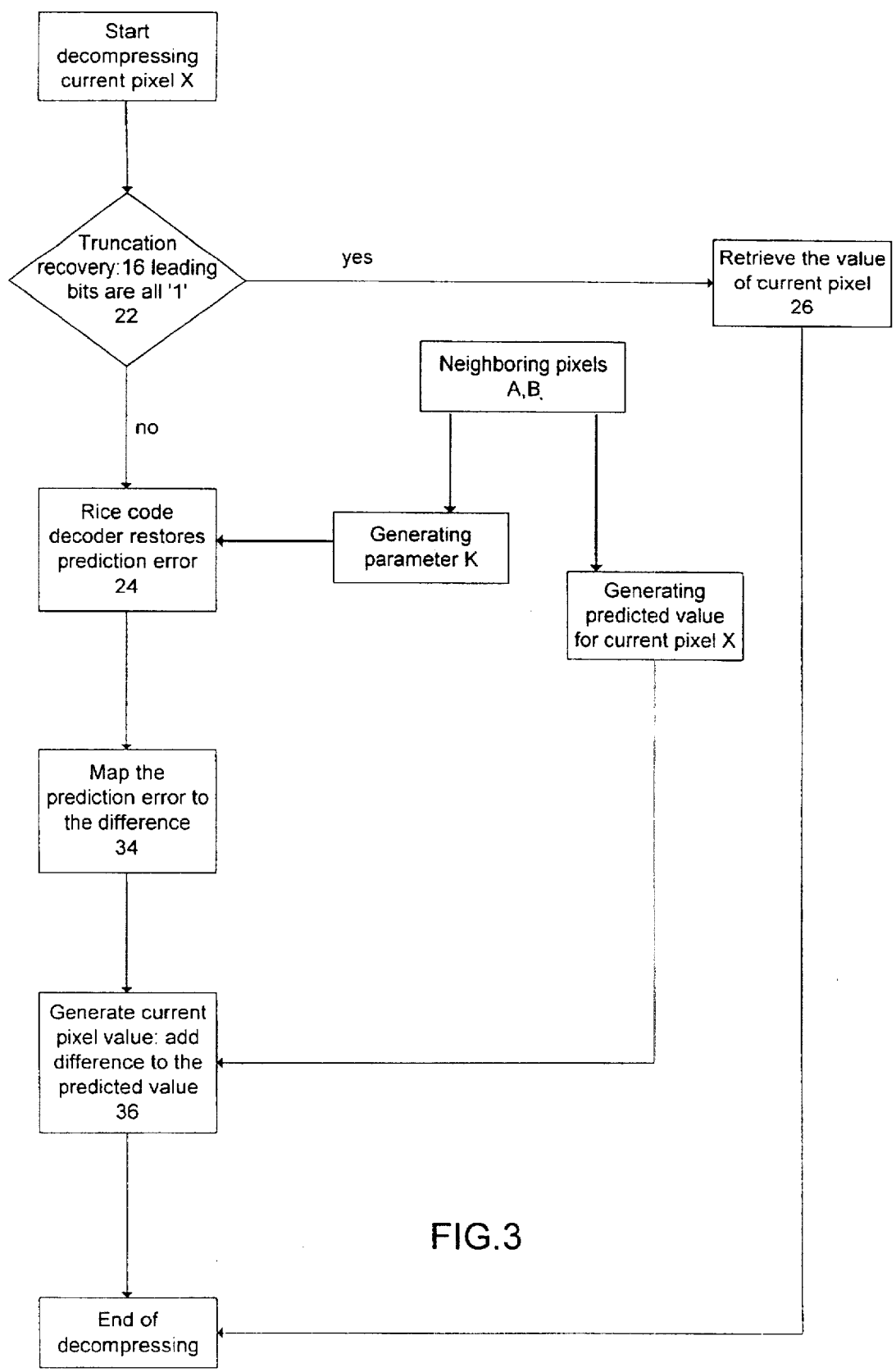
FIG. 3 shows the procedures of the decompressing method according to the present invention.

As shown in FIG. 3, the decompressing method of the present invention includes four major procedures: Histogram Tail Truncation Recovery 22, Rice code decoding 24, Mapping of the prediction error 34, and Generating of current pixel value 36. The detailed explanations for each major procedure are described as follows.

(a) Histogram Tail Truncation Recovery

First, to determine whether the code has a prefix containing 16 leading "1" bits, or not. If yes, the value of current pixel is retrieved directly from the last 8 bits in block 26. Otherwise, the code is sent to the Rice decoder 24 to restore the prediction error.

For instance, as the code 111111111111111100001010 is under decompressing, one may use several AND gates to detect the existence of 16 leading "1" bits. The binary code 00001010 will be retrieved directly in block 26, and the following steps are skipped.

(b) Rice Decoding

In block 24 of FIG. 3, using the same criteria as aforementioned paragraphs reciting Rice code encoding, the parameter K is generated based on the difference between the neighboring pixels. According to the respective values of parameter K obtained, the variable-length Rice code is decoded to restore the prediction error e' for current encoded pixel.

For instance, suppose values A, B of the neighboring pixels are correctly decompressed into 130, 146 respectively. Using the same criteria involved in compressing, i.e. $\Delta=|A-B|$ and $k=\alpha(\Delta)$, the parameter k is 4. Application the Rice code decompressing formula to the Rice code 01011: the original value n=number of Unary "1" bit * $\lfloor (n/2^k) \rfloor + (n \bmod 2^k) = 0+11=11$. Therefore, the Rice code 01011 will be restored to the original value 11 of prediction error e'.

(c) Mapping of the Prediction Error

Now that the prediction error e' is generated, it is reverse-mapped back to the difference e, the difference between the predicted value and current pixel value. The reverse-mapping process is performed by the following procedures.

```
{
if (p < 128)
    if (e' ≤ 2*p)
```

$$\text{if } (e' \text{ is odd}) \; e = \left\lfloor \frac{e'}{2} \right\rfloor + 1$$

$$\text{else } e = -\frac{e'}{2}$$

```
    else e = e' - p
else
    if (e' ≤ 2*p̄)
```

$$\text{if } (e' \text{ is odd}) \; e = \left\lfloor \frac{e'}{2} \right\rfloor + 1$$

$$\text{else } e = -\frac{e'}{2}$$

```
    else e = -e' - p
}
```

(d) Generation of Current Pixel Value

The predicted value for current pixel is generated by the formula, p=(A+B)/2, taking into account the same neighboring pixels involved in compressing. The final step to restore the value of current pixel is to add the predicted value to the difference e which can be performed by an adder performing the function x=p+e.

(e) Circuit

Figure 4:
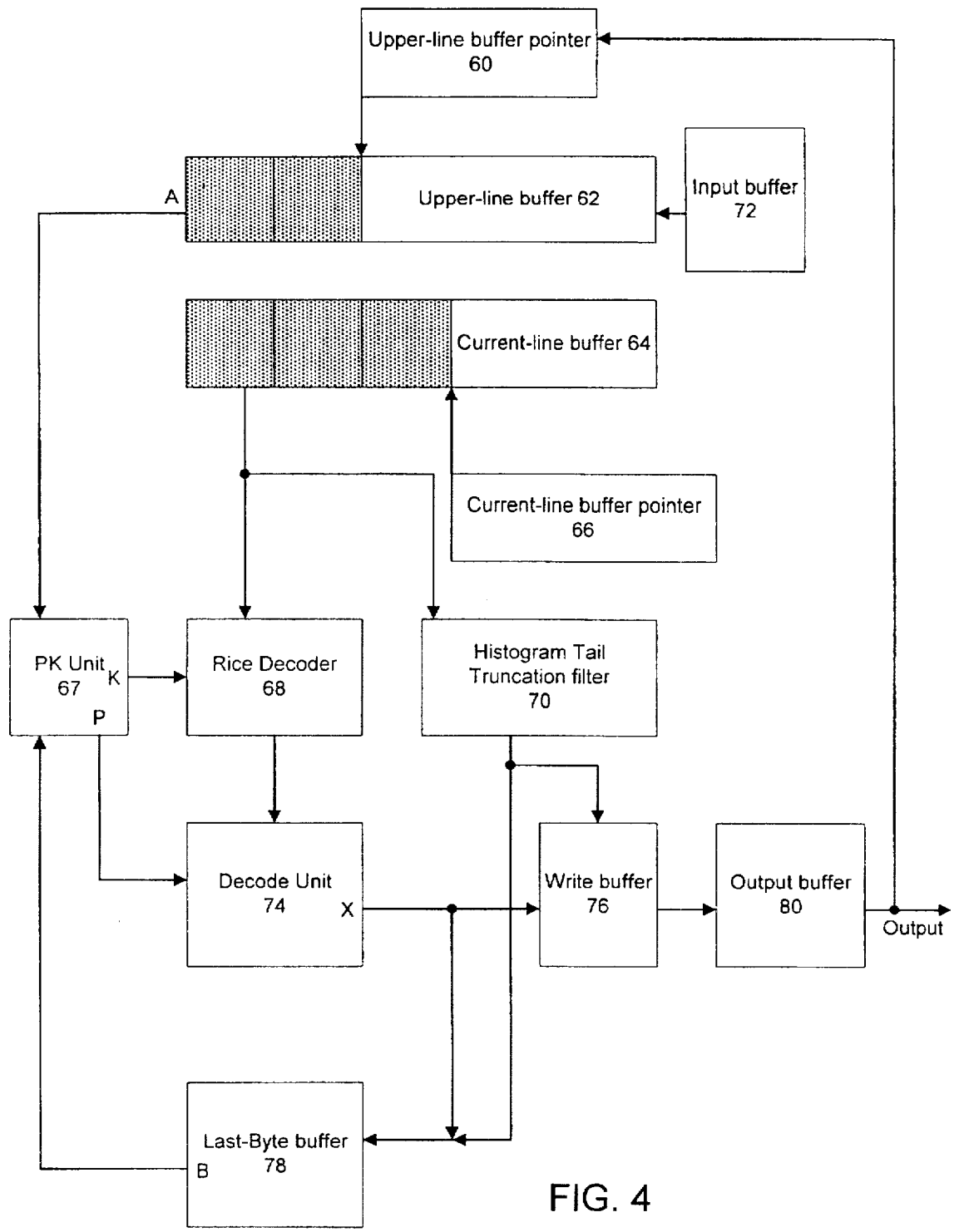
FIG. 4 shows a preferred embodiment of an apparatus employing the decompressing method of the present invention.

In order to complete the decompressing process of the invention, the invention provides a decompressing circuit as shown in FIG. 4. The processes performed respectively are: (1) a pixel data sent from current line buffer 64 to Rice code decoder 68 for decoding, or to Histogram tail truncation filter 70 for retrieving the 8-bit binary value; P, K, 8-bit binary values are generated; (2) e', is sent from decoder 68 to Decode unit 74 to generate X value; (3) either output from tail truncation filter 70 or Decode unit 74 is written into the write buffer 76; (4) data in write buffer is sent to output buffer 80.

As a 32 bits bus is used in the system (not shown), the most efficient way to perform the buffer read-write operation is performing data transfer in word unit, i.e. 32 bits. The input buffer 72 receives and temporally stores the compressed image data from a storage apparatus (not shown), and the output buffer 80 temporally stores and outputs those decompressed image data to the external peripheral devices (not shown). Whenever it collects more than 32 bits of decompressed data, the 64 bits write buffer 76 outputs thirty-two bits of content into the output buffer 80.

The current-line buffer 64 and upper-line buffer 62 both are sixty-four bits wide, and there are two pointers, current-line buffer pointer 66 and upper-line buffer pointer 60, indicating the length of their contents respectively. The data stored in the current-line buffer 64 are waiting for decompressing, and the value of current-line buffer pointer 66 represents how many bits of data currently are stored. When the value of current-line buffer pointer 66 is less than thirty-two, it indicates there are more than thirty-two bits of current-line buffer 64 to be empty and a thirty-two-bit data transfer is immediately actuated from the input buffer 72 to the current-line buffer 64.

Due to the Histogram tail truncation process aforementioned, the longest code in the present method is twenty-four bits, therefore, after each 32 bits data transfer from input buffer 32, there always exists at least 1 compressed code in the current-line buffer 64 waiting for decompressing. The upper-line-buffer 62 provides the necessary neighboring pixels information for decompressing. Whenever one code is decompressed, the upper-line buffer pointer 60 is decreased by 1 byte. Similar to the current-line buffer 64, if the value of upper-line buffer pointer 60 is less than thirty-two, it means more than 32 bits of upper-line buffer 62 are empty and the CPU immediately actuates a 32-bit data transfer from the output buffer 80 to the upper-line buffer 62.

The PK-unit 67, which generates the parameter K and predicted value p, receives the values A, B of neighboring pixels from upper-line buffer 62 and last-byte buffer 78 respectively.

According to the value of parameter K, the Rice code decoder 68 decompresses the code coming from the current-line buffer 64 by detecting the first "0" bit and by recognizing the succeeding k-bit binary code, and outputs the prediction error e' to the decode unit 74.

Based on the values of e' and p, the decode unit 74 restores the values of difference e, and current pixel value x, via formula x=P+e, and sends it to the write buffer 76 and last-byte buffer 78 simultaneously.

Figure 5:
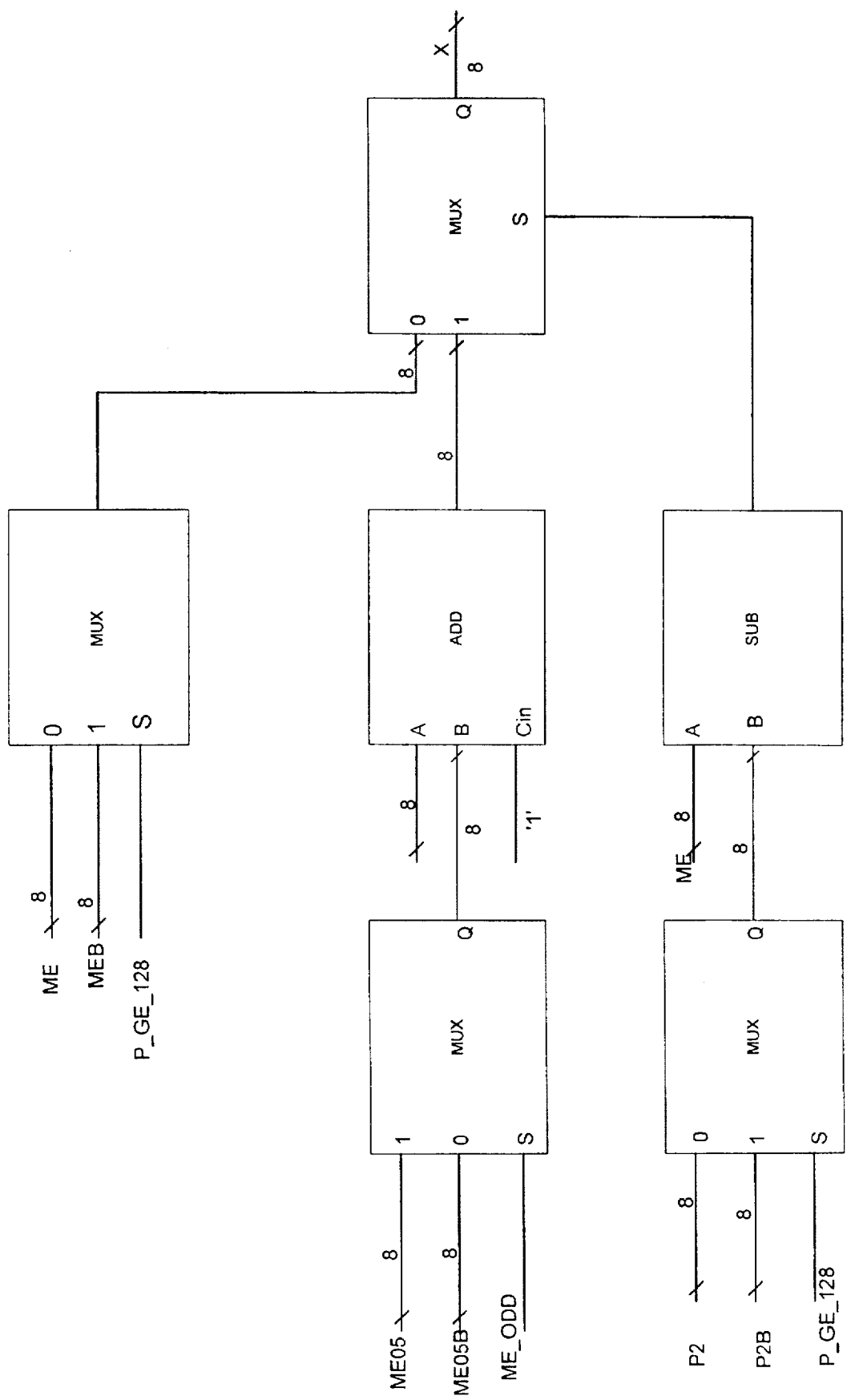
FIG. 5 shows a detailed circuit design for Decode unit in FIG. 4.

FIG. 5 shows the circuit diagram for one preferred embodiment of the decode unit 74 of FIG. 4. This circuit performs the prediction error reverse-mapping process mentioned above to restore the value of current pixel X. Wherein, MUX represents a multiplexer function, ADD represents an adder function, SUB represents a subtraction function. The symbols used in FIG. 5 are listed in the followings.

| | |
|---|---|
| $ME = e'$, | $MEB = \overline{e'} = (255 - e')$ |
| $ME05 = e'/2$, | $ME05B = \overline{e'/2} = (255 - ME05)$ |
| $P2 = P*2$, | $P2B = (255 - P2)$ |
| $ME\_ODD = 1$ | when $e'$ is odd, |
| $= 0$ | when $e'$ is even, |
| $P\_GE\_128 = 1$ | when $p \geq 128$, |
| $= 0$ | when $p < 128$. |

Although the invention has been disclosed with the preferred embodiment disclosed herein, those skilled in the art will appreciate numerous modification and enhancements can be made without departing from the true spirit of the invention. All such modification and enhancements are intended to be included within the scope of the following claims.

What is claimed is:

1. A lossless compression method for a digitized image, the digitized image including a current pixel, which has a value X, and two neighboring pixels adjacent to the current pixel, the two neighboring pixels having values A and B respectively, and Δ being the difference between A and B, comprising the steps:

using a first algorithm to generate a predicted value P for the current pixel based on the values A and B;

calculating a prediction error e' based on a one-to-one mapping of the difference e between the predicted value P and the current value X;

generating a parameter K which is a predetermined non-constant function of the difference Δ;

encoding the prediction error e' of the current pixel by assigning a Rice code thereto based on the parameter K, to thereby obtain a Rice encoded code; and replacing the Rice encoded code by a predetermined code pattern followed by the current value X if the Rice encoded code obtained for the current pixel is longer than a predetermined length.

2. Method according to claim 1, wherein the predetermined code pattern is a set of consecutive "1" bits.

3. Method according to claim 1, wherein the difference e is a signed quantity and may have a positive value or a negative value;

the prediction error e' is an unsigned quantity and does not include any negative values;

a small absolute value of the difference e corresponds to a small value of the prediction error e'; and the number of bits required to represent the unsigned prediction error e' is less than the number of bits required to represent the signed difference e.

4. The method of claim 3, wherein the predetermined function for generating K consists essentially of:

k=1 Δ≦2
k=2 2<Δ≦4
k=3 4<Δ≦8
k=4 8<Δ.

5. Method according to claim 1, further comprising a subsequent decompression procedure comprising the steps of:

determining whether the leading bits of the encoded code consists of the predetermined code pattern; and if the leading bits of the encoded code consist of the predetermined code pattern, outputting X.

6. Method according to claim 1, further comprising a subsequent decompression procedure comprising the steps of:

determining whether the leading bits of the encoded code consist of the predetermined code pattern; and if the leading bits of the encoded code does not consist of the predetermined code pattern, generating a decoded predicted value P for the current pixel based on previously decoded values A and B for the neighboring pixels, using said predetermined function to generate a decoded parameter K from the decoded difference Δ of the decoded values A and B;

using the decoded value of the parameter K and the inverse of said Rice code to obtain a decoded prediction error e' from the encoded code;

using a second mappling function which is the inverse of said one-to-one mapping function to obtain a decoded difference e from the decoded prediction error e'; and adding the decoded predicted value P to the decoded difference e to obtain the decoded value X of the current pixel.

7. The method of claim 1, wherein the predetermined function for generating K consists essentially of:

k=1 Δ≦2
k=2 2<Δ≦4
k=3 4<Δ≦8
k=4 8<Δ.

8. A lossless compression method for a digitized image, the digitized image including a current pixel, which has a value X, and two neighboring pixels adjacent to the current pixel, the two neighboring pixels having values A and B respectively, and Δ being the difference between A and B, comprising;

an encoding process including the steps:

using a first algorithm to generate a predicted value P for the current pixel based on the values A and B;

calculating a prediction error e' based on a one-to-one mapping of the difference e between the predicted value P and the current value X;

generating a parameter K which is a predetermined non-constant function of the difference Δ;

encoding the prediction error e' of the current pixel by assigning a Rice code thereto based on the parameter K, to thereby obtain a Rice encoded code; and if the Rice encoded code obtained for the current pixel is longer than a predetermined length, replacing the Rice encoded code by a predetermined code pattern followed by the current value X a subsequent decoding process comprising the steps:

determining whether the leading bits of the encoded code consists of the predetermined code pattern:

if the leading bits of the encoded code consist of the predetermined code pattern, outputting X, determining whether the leading bits of the encoded code consist of the predetermined code pattern:

if the leading bits of the encoded code does not consist of the predetermined code pattern, generating a decoded predicted value P for the current pixel based on previously decoded values A and B for the neighboring pixels, using said predetermined function to generate a decoded parameter K from the decoded difference Δ of the decoded values A and B;

using the decoded value of the parameter K and the inverse of said Rice code to obtain a decoded prediction error e' from the encoded code and;

using a second mapping function which is the inverse of said one-to-one mapping function to obtain a decoded difference e from the decoded prediction error e'; and adding the decoded predicted value P to the decoded difference e to obtain the decoded value X of the current pixel, wherein the predetermined code pattern is a set of consecutive "1" bits, the difference e is a signed quantity and may have a positive value or a negative value;

the prediction error e' is an unsigned quantity and does not include any negative values;

a small absolute value of the difference e corresponds to a small value of the prediction error e';

the number of bits required to represent the unsigned prediction error e' is less than the number of bits required to represent the signed difference e; and the predetermined function for generating K consists essentially of:

k=1 $\Delta \leqq 2$ k=2 $2 < \Delta \leqq 4$ k=3 $4 < \Delta \leqq 8$ k=4 $8 < \Delta$.

* * * * *

UNITED STATES PATENT AND TRADEMARK OFFICE
CERTIFICATE OF CORRECTION

PATENT NO.    : 5,751,860
DATED         : May 12, 1998
INVENTOR(S)   : Yang-chun Su and Yu-Wen Huang It is certified that error appears in the above-identified patent and that said Letters Patent is hereby corrected as shown below:

Title page,
Item [57], ABSTRACT,
Line 2, replace "consisting of" with -- incorporates the --, and after "generating" insert -- of --.
Line 3, replace the second occurrence of "the" with -- a --.
Line 5, delete "is provided".
Line 8, replace "on" with -- for --.
Line 12, replace "Afterwards" with -- Afterward --.
Line 14, delete "respective".
Line 15, replace "values" with -- value --.
Line 16, replace "each" with -- the --.
Line 17, delete "of each pixel".
Line 20, after "by" insert -- a --.

Column 1,
Line 7, delete "of".
Line 12, after "compressing" insert -- a -- and after "of" insert -- a --.
Line 17, replace "de-compressing" with -- decompressing --.
Line 19, after "hereinafter" insert -- the --.
Line 20, after the second occurrence of "of" insert -- a --.
Line 21, delete "of".
Line 22, after "In" insert -- the --.
Line 30, delete "data" and delete "of".

Column 2,
Line 16, after "by" insert -- a --.
Line 18, after "of" insert -- the --.
Line 22, after "invention," insert -- the --, and after "creating" insert -- a --.
Line 25, replace "tremendous" with -- tremendously --.
Line 28, replace "un-necessity" with -- lack of necessity --, and after "of" insert -- a --.
Line 31, after "of" insert -- a --.

UNITED STATES PATENT AND TRADEMARK OFFICE
CERTIFICATE OF CORRECTION

PATENT NO. : 5,751,860
DATED : May 12, 1998
INVENTOR(S) : Yang-chun Su and Yu Wen Huang It is certified that error appears in the above-identified patent and that said Letters Patent is hereby corrected as shown below:

Column 3,
Line 7, after "for" insert -- the --.
Line 12, after "is" insert -- the --.
Line 13, replace "row same" with -- same row --.
Line 14, replace "column same" with -- same column --.
Line 23, replace "encoding" with -- Encoding --.
Line 26, replace "Prediction" with -- Prediction: --.
Line 27, replace "characteristic" with -- characteristics --.
Line 29, after "in" insert -- an --.
Line 34, after "for" insert -- the --.

Column 4,
Line 3, replace "value of pixel" with -- values of pixels --, and replace "is" with -- are --.
Line 19, replace "optional to" with -- option for --.

Column 5,
Lines 2 and 7, replace "errors" with -- error --.
Line 8, after "by" insert -- the --.
Line 11, replace "example of" with -- example, for --.
Line 15, replace "code encoding" with -- Code Encoding --.
Line 17, delete "the" and replace "statistic" with -- statistical --.
Line 22, delete the first occurrence of "the".
Line 25, after "of" insert -- the --.
Line 29, replace "bit" with -- bits --.

Column 6,
Line 11, delete "the".
Line 16, after "using" insert -- the --.
Line 18, after "deciding" insert -- if --.
Line 25, replace "A, B" with -- A and B --.
Line 27, after "of" insert -- a --.
Line 28, before "$\alpha$" insert -- where --.

UNITED STATES PATENT AND TRADEMARK OFFICE
CERTIFICATE OF CORRECTION

PATENT NO.   : 5,751,860
DATED        : May 12, 1998
INVENTOR(S)  : Yang-chun Su and Yu Wen Huang It is certified that error appears in the above-identified patent and that said Letters Patent is hereby corrected as shown below:

Column 7,
Line 8, after "Using" insert -- the --.
Line 14, replace "the" with -- a --.
Lines 16, 21, 24 and 27, after "of" insert -- the --.
Line 25, replace "work" with -- works --.
Line 26, replace "representing" with -- represents --.
Line 28, after "in" insert -- the --, and replace "A, B" with -- A and B --.
Line 29, replace "and" with -- the --.
Line 31, replace ". Then the" with -- , then --.
Line 32, after "Using" insert -- the --.

Column 8,
Line 1, replace "bit" with -- bits --, and before "partition" insert -- the --.
Line 4, after "with" insert -- the --, and replace "Histogram Tail" with -- histogram tail --.
Line 15, after "performing" insert -- the --.
Line 21, replace "code decoding" with -- Code Decoding --.
Line 22, replace "prediction error" with -- Prediction Error --.
Line 23, replace "current pixel value" with -- Current Pixel Value --.
Line 26, delete "to".
Line 28, after "of" insert -- the --.

Column 9,
Line 1, replace "decoding" with -- Decoding --.
Line 2, after "as" insert -- the --.
Lines 4 and 6, replace "K" with -- $K$ --.
Line 8, after "for" insert -- the --.
Line 9, replace "A, B" with -- A and B --.
Line 10, replace "130, 146" with -- 130 and 146 --.
Line 13, after "Application" insert -- of --.
Line 18, replace "prediction error" with -- Prediction Error --.

UNITED STATES PATENT AND TRADEMARK OFFICE
CERTIFICATE OF CORRECTION

PATENT NO. : 5,751,860
DATED : May 12, 1998
INVENTOR(S) : Yang-chun Su and Yu Wen Huang It is certified that error appears in the above-identified patent and that said Letters Patent is hereby corrected as shown below:

Column 10,
Line 5, replace "current pixel value" with -- Current Pixel Value --.
Line 6, after "for" insert -- the --.
Line 9, after "of" insert -- the --.
Line 16, replace "pixel" with -- pixel's --, and after "data" insert -- is --.
Line 18, replace "Histogram" with -- histogram --.
Lines 20 and 22, replace "Decode" with -- decode --.
Lines 25 and 33, replace "bits" with -- bit --.
Line 27, replace "unit" with -- units --.

Column 11,
Line 12, delete "to be".
Line 15, replace "Histogram" with -- histogram --.
Line 17, replace "bits" with -- bit --.
Line 30, replace "A, B" with -- A and B --.

Column 12,
Line 5, after "via" insert -- the --.
Line 5, replace "$P$" with -- $p$ --.
Line 10, replace "$X$" with -- $x$ --.
Line 11, replace "Wherein" with -- Therein --.
Line 14, replace "followings" with -- following --.
Line 25, after "appreciate" insert -- that --, and replace "modification" with
-- modifications --.
Line 27, replace "modification" with -- modifications --.

Signed and Sealed this

Thirtieth Day of August, 2005

JON W. DUDAS
*Director of the United States Patent and Trademark Office*